Patented May 21, 1940

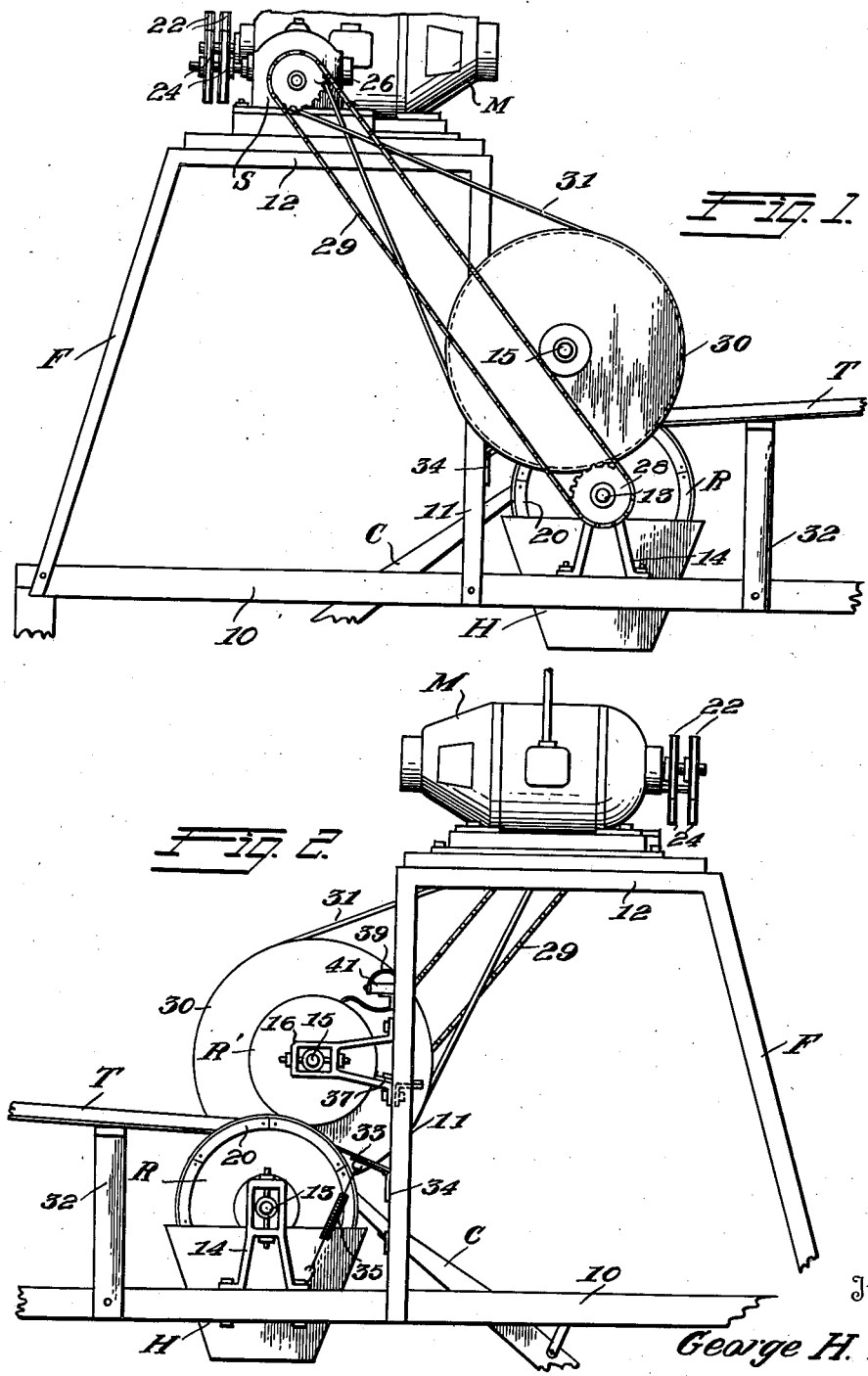

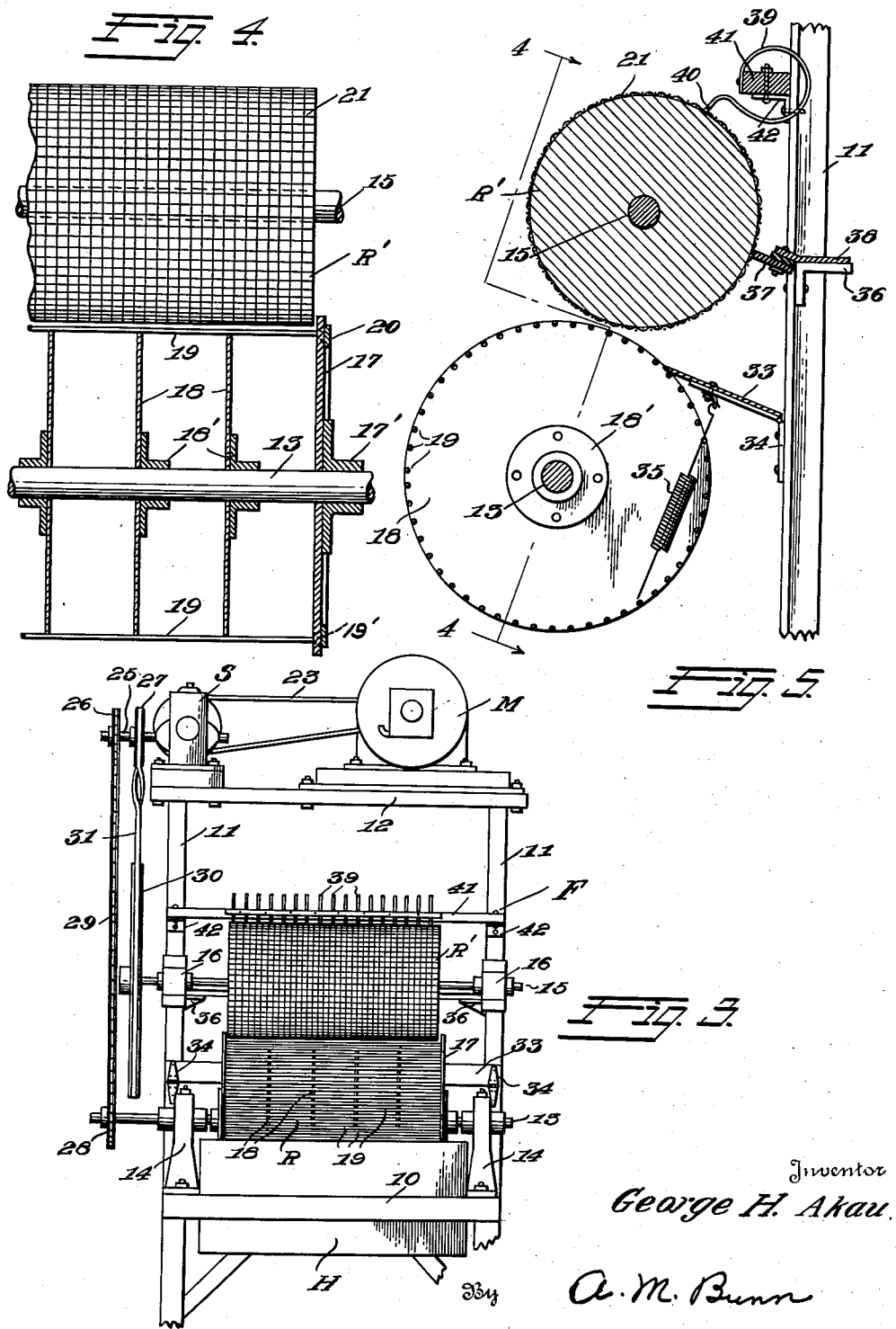

2,201,514

UNITED STATES PATENT OFFICE 2,201,514

PAPAYA PEELER

George H. Akau, Honolulu, Territory of Hawaii, assignor of one-fifth to George Ronitz, Honolulu, Territory of Hawaii Application June 24, 1939, Serial No. 281,048

1 Claim. (Cl. 146—43)

This invention relates to a peeler for papaya and the like.

More particularly, the invention relates to apparatus for separating the skin and pulp of melon-like fruits and squash-like vegetables and is primarily adapted for removing the pulp from the skin of ripe or nearly ripe papaya.

As is generally known, the papaya is a tropical fruit and in most characteristics strongly resembles a musk melon. This fruit is spherical to oblong in form and has a thin skin which is smooth on the exterior. The flesh or pulp of the fruit envelops a relatively large central cavity the walls of which have numerous seeds attached thereto. The papaya is highly palatable and is to a large extent available to the consumer as a canned product.

In the canning of papaya it has been the practice to some extent to grind the whole fruit. This, however, provided a product which was dark in color and unpalatable due to the bitter substances contained in the crushed skins and seeds.

The practice at present in vogue for providing a higher grade canned product is to cut the fruit in halves, remove the seeds and thereafter separate the pulp from the skin with a wooden spoon. This practice, of course, provides a product which is superior to that provided by the practice first referred to and has the color and taste of the highly palatable papaya fruit pulp; but, entails considerable time and is not conducive to economy in the operation of canning the fruit.

It is a primary object of this invention to provide an apparatus for efficiently and expeditiously removing the pulp from the skin of papaya fruit as well as other melon-like fruits and squash-like vegetables, such as the cantaloupe and the cooked pumpkin.

A further object of the invention is the provision of an apparatus for separating the skin and pulp of papaya fruit and the like with a minimum waste of the pulp.

A still further aim is the provision of an apparatus of the above noted character which is relatively simple in construction, highly efficient in operation, and which is capable of manufacture at relatively low cost.

For a more complete understanding of the nature and objects of the invention, reference will be had to the following detailed description, taken in conjunction with the accompanying drawings, wherein:

Fig. 1 is a left side elevation of the apparatus, in a preferred embodiment thereof.

Fig. 2 is a right side elevation of the apparatus.

Fig. 3 is a front elevation of the apparatus.

Fig. 4 is a view partially in elevation and partially in section, the view being taken in planes as represented by the broken line 4—4 in Fig. 5, some of the parts being omitted in this figure for the sake of clarity.

Fig. 5 is a transverse vertical section through the cooperating rollers included in the apparatus.

Referring now in detail to the drawings by reference characters, and wherein like characters designate like parts, F designates a frame of suitable construction and form for supporting the various cooperating elements in the apparatus and generally includes a base portion 10, vertical uprights 11, and a top portion 12.

The essential elements in the apparatus comprise a pair of cooperating rollers between which sections of the fruit or vegetables are fed and comprises a lower roller, R, and an upper roller R'. The lower roller R is of open or squirrel-cage construction and is supported by a shaft 13 journalled adjacent opposite ends in bearings 14 secured to the bottom portion 10 of the frame.

The upper roller R' is supported by a shaft 15 whose opposite ends are journalled in bearings 16 secured to the vertical uprights 11 of the frame. The roller R comprises end plates or discs 17 and intermediate discs 18 which are preferably thinner than the discs 17 and are equally spaced from each other and the discs 17 longitudinally of the shaft 13. The discs 17 and 18 have hubs 17' and 18' respectively secured thereto and which in turn are attached to the shaft 13.

The periphery of the roller R is formed with a plurality of rods 19 (only two of which are illustrated in Fig. 4) which extend longitudinally of the shaft 13 in equally spaced relation circumferentially of the roller as is clearly illustrated in Fig. 5. These rods are of stainless steel and rest in recesses in the peripheries of the discs 18 and have their opposite ends extended through and countersunk in apertures in the discs 17 adjacent the peripheries thereof, as indicated at 19'. Arcuate plates 20 are fastened to the outer faces of the discs 17 to keep the rods from becoming lose. The upper roller R' is solid, as indicated in Fig. 5, and is constructed of wood, the periphery thereof, however, being covered with galvanized wire screen 21 in order to frictionally grip the smooth skin of the fruit.

The rollers R and R' are driven at different rates of speed, the lower roller travelling from three to four times as fast as the upper roller and to effect such a drive the following mechanism is provided.

An electric motor M is supported adjacent one end of the top portion 12 of the frame and has secured to its shaft a pair of pulleys 22 which through the V-belts 23 drive the pulleys 24 on the shaft of a speed reduction unit S. The unit S includes a shaft 25 to which is secured, adjacent its outer end, a sprocket wheel 26 and inward thereof a V-belt pulley 27. A sprocket wheel 28 is fastened to an end of the shaft 13 and is operatively connected with the sprocket wheel 26 by a sprocket chain 29. The sprocket wheels 26 and 28 are of the same size whereby the lower roller R rotates at the same speed as the shaft 25. Pulley 30 is fixed to an end of the upper roller shaft 15 and is approximately three times the diameter of the cooperating pulley 27. The pulleys 27 and 30 are encircled by a crossed V-belt 31 for driving the shaft 15 at approximately one-third the speed of rotation of the shaft 25.

As is indicated in Figs. 3, 4 and 5, the peripheries of the rollers R and R' are in slightly spaced relation for a purpose later to appear and this space can readily be varied through the adjustable bearings 14 and 16 as indicated. It is to be further noted that the end discs 17 of the lower roller R lap the ends of the upper roller R'.

A suitable feed table T is attached to the bottom portion 10 of the frame as by a bracket 32. The table is slightly inclined downward toward the rollers and is adapted to support the fruit as it is moved to position between the rollers.

A scraper or skin remover is supported by the uprights 11 between same and the lower roller R. The scraper is intended to remove the skin from the roller R and preferably comprises a sheet steel strip 33 hingedly connected with the uprights as at 34 and yieldably and adjustably maintained in operative engagement with the roller by a coil spring 35. Also fixed to the frame F adjacent the bottom portion 10 thereof is a waste discharge chute C, the chute inclining downwardly from the roller R and having its upper end closely adjacent the periphery of the roller.

Another scraper which cooperates with the upper roller R' is secured to the uprights 11 by sprockets 36 and comprises an elongated strip of hard rubber 37 held in position relative to the brackets by a steel plate 38. A wire scraper for cooperation with the upper roller R' is secured to the uprights 11 and comprises a plurality of curved wires 39 having ends 40 closely adjacent the periphery of the roller. The wires 39 are secured to an elongated plate 41 which in turn is fastened to the uprights 11 by brackets 42. A hopper H is attached to the frame in encircling relation to the lower portion of the roller R and is adapted to receive the fruit pulp.

In the use of the improved apparatus the papaya is first trimmed at both ends thereof. It is then cut into quarters after which the seeds are removed with a wooden spoon. The quartered fruit sections are then placed skin-side upward and manually fed along the feed table T and between the revolving rollers R and R' which, as before stated, are slightly spaced at their peripheries. The upper roller R' which revolves approximately 14 revolutions per minute grips the skin of the fruit by virtue of its wire screen surface and forces the fruit downward and forward while the lower roller R which revolves approximately 42 revolutions per minute scrapes the pulp from the sections fed by the upper roller R'. The removed pulp falls downward by gravity between the rods 19 and into the hopper H. The skin which has completely had the fruit pulp removed therefrom continues forward and is removed from the roller R by the scraper 33. Should the skin adhere to the upper roller R' it will be removed therefrom by the scraper 37. Any skins or particles thereof which get by the scraper 37 are effectively removed by the wire scraper.

It will be seen from the foregoing that an apparatus is provided in accordance with this invention which is highly practical in that the pulp and skins of fruit or vegetables are capable of expeditious separation without any appreciable waste of the pulp.

While I have disclosed but a single specific embodiment of my invention, the same is to be considered as illustrative only, and not restrictive, the scope of the invention being defined in the subjoined claim.

What I claim and desire to secure by U. S. Letters Patent is:

Apparatus for removing the pulp from the skin of papaya fruit or the like comprising a frame, upper and lower rotatable rollers journalled in the frame with their peripheries in closely spaced relation, means supported on the frame for rotating the rollers, with the lower roller rotating faster than the upper roller a table in advance of the rollers for manually feeding sections of the fruit between the rollers with the skin side of the fruit upward, the upper roller having a friction surface for engaging the skin of the fruit and moving it forward and toward the lower roller, the lower roller having a periphery for engaging the pulp and removing same from the skin while the fruit is being advanced by the upper roller, said lower roller comprising a pair of end discs having circumferentially spaced apertures adjacent their peripheries, a plurality of spaced discs intermediate the end discs and having circumferentially spaced notches in their peripheries, a plurality of steel rods extending longitudinally of the roller with their opposite ends countersunk in said apertures and their intermediate portions seated in said notches, and plates secured to the outer faces of the end discs for preventing the rods from becoming loose.

GEORGE H. AKAU.